United States Patent [19]

Pommier et al.

[11] Patent Number: 4,822,826

[45] Date of Patent: Apr. 18, 1989

[54] COMPOSITE MATERIAL AND METHOD OF MANUFACTURING SAME

[75] Inventors: Jean-Claude Pommier, Gradignan; Joel Poustis, Pessac, both of France

[73] Assignee: La Cellulose Du Pin, Bordeaux, France

[21] Appl. No.: 94,134

[22] Filed: Sep. 4, 1987

[30] Foreign Application Priority Data

Sep. 4, 1986 [FR] France ................... 86 12414

[51] Int. Cl.$^4$ ............................................. C08L 98/02
[52] U.S. Cl. ................................. 521/84.1; 428/243; 428/295; 428/496; 428/507; 523/222; 524/9; 524/13; 524/35
[58] Field of Search ............... 521/84.1; 428/243, 295, 428/496, 507; 523/222; 524/9, 13, 35

[56] References Cited

U.S. PATENT DOCUMENTS

| | | | |
|---|---|---|---|
| 3,697,364 | 10/1972 | Boustany et al. | 428/496 |
| 3,943,079 | 3/1976 | Hamed | 524/14 |
| 4,286,030 | 8/1981 | Moore | 428/302 |

OTHER PUBLICATIONS

Rabkin et al., "Sizing of Yarn from a Blend of Polyester and Cellulose Fibers", CA108(8): 57844f.

*Primary Examiner*—Morton Foelak
*Assistant Examiner*—S. A. Acquah
*Attorney, Agent, or Firm*—Oblon, Fisher, Spivak, McClelland & Maier

[57] ABSTRACT

A composite material comprised of a thermoplastic resin matrix and a cellulosic fiber reinforcing material is prepared by reducing the water content of the fibers prior to exposure to the resin.

18 Claims, No Drawings

COMPOSITE MATERIAL AND METHOD OF MANUFACTURING SAME

BACKGROUND OF THE INVENTION

1. Field of the Invention

The invention relates to a method of manufacturing composite materials based on a matrix comprised of thermoplastic resin, with reinforcement comprising a material based on discontinuous cellulosic fibers; and the product of such manufacture.

2. Background of the Prior Art

Cellulosic fibers are candidates for use as reinforcement at a level comparable to that of glass fibers, based on their mechanical characteristics and density. They have the advantage of cost, which supplies the motivation for developing techniques of employing them.

There is known, e.g., from Eur. OS 0 062 533, a composite material comprising cellulosic fibers dispersed in a polyvinyl chloride matrix. According to this OS the cellulosic fibers are mixed with the matrix and a binding agent which improves adhesion between the fibers and the matrix.

There is also known, from U.S. Pat. No. 3,943,079, a means of promoting dispersion of discontinuous cellulosic fibers in a matrix comprised of an organic polymer, by pretreating the fibers with a composition comprising a lubricant and a thermoplastic polymer.

It is an object of the present invention to provide a method to manufacture composite materials comprised of cellulosic fibers in a matrix comprised of a thermoplastic resin, particularly an unsaturated polyester resin. The composite materials envisioned are highly disperse, in the form of compounds, felts, sandwich materials, etc.

SUMMARY OF THE INVENTION

Unsaturated polyester resins are particularly well adapted to preparation of composites, due to their thermoplastic qualities. Unsaturated polyester resins are liquid resins which contain bidimensional chains and contain styrene in excess. In the presence of a catalyst, with or without the supply of energy, crosslinking occurs, with formation of styrene bridges, whereby the resin hardens. However, when attempts are made to form composites comprised of cellulosic fibers and polyester resins, generally the resulting product is unsatisfactory. In particular it is difficult to obtain penetration of the resin into the layer comprising intermingled cellulosic fibers; this incompatibility between the two components leads, after crosslinking of the resin and molding, to an inhomogeneous material which does not have the desired mechanical properties.

The reason for this observed incompatibility is not known precisely. It is known that cellulosic fibers, with their hydroxyl groups, have a highly hydrophilic character, whereas polyester resins are highly lipophilic due to the presence in them of long carbon chains.

It is an object of the present invention to render compatible the cellulosic fibers and thermoplastic resins, particularly polyester resins, whereby it becomes possible to prepare a generally homogeneous composite material having satisfactory characteristics with respect to moisture uptake, bending strength (at failure), and bending modulus.

This object is achieved according to the invention by a method of manufacturing a composite material which material is comprised of a matrix based on a thermoplastic resin, particularly a polyester resin or an epoxy resin, and is further comprised of a reinforcing component based on discontinuous cellulosic fibers, wherein, before combining the thermoplastic resin and the cellulosic reinforcing component, the reinforcing component is pretreated to lower its water content to zero or near-zero.

The inventive method is employed advantageously in manufacturing a composite material based on polyester resin. The inventors have discovered that the elimination of water modifies the surface of the cellulosic fibers in such a way as to facilitate subsequent penetration of the polyester resin into the cellulosic material. It is hypothesized that under these conditions the locations formerly occupied by the water are more readily filled-in by the polyester resin than is the case when the fibers are not so pretreated. The cellulosic fibers at ambient atmospheric conditions generally contain up to c. 10 wt. % water. Elimination of this water appreciably modifies the surface state of the fibers.

DETAILED DESCRIPTION OF THE INVENTION

The inventive treatment can be carried out in a variety of ways. Generally, thermal and/or chemical means are employed.

According to a first embodiment of the method, the thermal treatment comprises heating the fibers under conditions such that their water content after the treatment is zero or near-zero.

According to a second embodiment, the chemical treatment comprises use of an essentially alcohol-based composition for lubrication treatment of the fibers.

The customarily employed lubricants, particularly for treating glass fibers, have complex compositions comprising a large number of bodying materials, fiber coupling agents, etc.

In contrast, in solving the problem posed the inventors employ a composition essentially comprised of an aqueous solution of an alcohol and possibly certain additives.

Among the monohydric or polyhydric alcohols which are candidates, advantageously ethanol or polyvinyl alcohol is chosen. Other alcohols such as butanol and heptanol are also good candidates.

According to a third embodiment of the method, the chemical treatment comprises use of a dielectric solvent based on fluorinated derivatives, the general mode of treatment being by spraying the solvent onto the fibers.

Obviously, a plurality of treatments may be combined, e.g. by treating thermally and treating chemically with a composition based on alcohol.

The invention is applicable to cellulosic fibers in general, such as are obtained from wood. Potential sources of cellulosic fibers include all types of pulps and the like prepared from wood. It is not necessary that such pulps be completely purified to remove all lignin.

Examples of the source of cellulosic fibers are: an unbleached or bleached chemical pulp such as is employed for manufacturing kraft paper or paper insulation; a thermomechanical pulp such as used for manufacturing newsprint; or a mixture of these pulps, used, e.g., for manufacturing papers or cardboards.

Variants of the invention correspond to different forms of the cellulosic fiber material to be treated.

In a first variant, a layer (mat) of cellulosic fibers is prepared which is then treated by heat and/or chemical means.

In a second variant, the fibers are treated in bulk, by heat and/or chemical means as used in the first variant.

In a third variant, a cellulosic fiber material is prepared comprised of two sheets of kraft paper enclosing (therebetween) a flat or undulating layer of cellulosic fibers; and this sandwich is then treated thermally and/or chemically.

Regardless of the gross form of the fiber material employed, the sequence of the inventive method is identical, and comprises the usual operations for preparing composite materials. The treated fiber material is placed in a mold where it is contacted with the resin along with a crosslinking accelerator. Temperature and pressure conditions are established in the mold which are associated with a suitable residence time for assuring crosslinking and curing of the resin. The material is then removed, and the quantity of fibers contained in it is determined.

Other characteristics and advantages of the invention will be apparent from the following description of exemplary embodiments. Measurements have been carried out in connection with the examples, in order to demonstrate the characteristics of composite materials produced by the inventive method.

The moisture uptake test enables the behavior of the composite with respect to moisture to be evaluated. In this test, a sample of the composite having known weight is completely immersed in water of pH c. 7, and the weight increase in the sample is measured over time. The moisture uptake is given as % weight increase in 1000 hr immersion.

EXAMPLE 1

A sheet of long fiber insulation pulp was prepared from maritime pine (*Pinus pinaster*) by the ammonium bisulfite process. The pulp basically was comprised of long fibers. It was treated to facilitate defibration without deterioration. A sheet of the pulp was characterized by specific gravity 0.6, thickness 1.5 mm, and weight 900 g/sq m. A "compound" was prepared from this sheet, namely a mat comprised of loose fibers and having dimensions 140×15×5 mm.

16 g of this pulp was treated thermally while being supported, in an oven at 100° C. for 1 hr.

It was then inserted in a mold along with 64 g Fourniplast ® polyester resin (supplied by the firm Scheby). Pressure of 20 kg/sq cm was applied for 15 min at 100° C.

The finished product had a homogeneous appearance, and fiber content of 26 wt. % (of the composite).

COMPARISON EXAMPLE

A comparison example was carried out. A composite containing glass fibers as reinforcing component for a polyester resin was prepared, and its mechanical characteristics were compared with those of an inventively prepared composite.

The glass-reinforced composite was prepared which contained loose glass fibers in the amount of 50 wt. %. The fibers were placed in a mold along with a polyester resin under conditions identical to those of Example 1.

The following characteristics were determined:
KEY: (a) Data for Example 1; (b) Data for the Comparison Example.

Specific gravity: (a) 1.2 (b) 1.9.
Failure under flexure (mPa): (a) 42 (b) 60.
Specific failure (MPa): (a) 36 (b) 31.5.
Modulus for flexure (GPa): (a) 2.8 (b) 2.
Specific modulus (GPa): (a) 2.4 (b) 1
Moisture uptake (wt. %): (a) 6 (b) 8.

It is seen that the characteristics of the product prepared according to the invention are similar to those of a composite comprised of glass fibers and polyester resin, even though the amount of reinforcing component (on a weight basis) is less for the inventively prepared product. In addition, an appreciable advantage in density was attained.

EXAMPLE 2

The procedure was the same as in Example 1, except that the mat was prepared from three layers of the same sheet of long fiber insulation pulp. Each of the layers was thermally treated separately according to the invention. Then the three sheets were assembled into a mat.

25 g of the mat and 78 g of the polyester resin were placed in the mold. The fiber content of the resulting composite was 40 wt. %. The composite had a homogeneous appearance.

The following characteristics were determined:

Specific gravity: 1.2.
Failure under flexure (MPa): 84.
Specific failure (MPa): 70.
Modulus for flexure (GPa): 4.8.
Specific modulus (GPa): 4.
Moisture uptake (wt. %): 10.2.

It is seen that the flexural failure strength and modulus have good values.

EXAMPLE 3

The procedure was basically the same as in Example 2, except that:
The mat was formed from two instead of three layers of pulp; and
The thermal treatment described was combined with a chemical treatment comprising spraying a dielectric solvent (SRB1 ®, supplied by Technoutil-Chimie) onto the mat.

32 g of the mat was mixed with 100 g of polyester resin. The resulting composite material was homogeneous, and had fiber content 40 wt. %.

The following characteristics were determined:

Specific gravity: 1.2.
Failure under flexure (MPa): 105.
Specific failure (MPa): 88.
Modulus for flexure (GPa): 7.
Specific modulus (GPa): 5.8.
Moisture uptake (wt. %): 13.3.

This example produced excellent mechanical properties.

EXAMPLE 4

The procedure was generally the same as in Example 3, except that:
150 g pulp and 330 g polyester resin were used; and
The compression in the mold was accomplished under initial vacuum.

The fiber content of the resulting composite was 50 wt. %.

The following characteristics were determined:

Specific gravity: 1.1.
Failure under flexure (MPa): 98.
Specific failure (MPa): 89.
Modulus for flexure (GPa): 6.
Specific modulus (GPa): 5.5.
Moisture uptake (wt. %): 21.4.

Here for the first time a superior homogenization of the composite was observed, probably due to the vacuum molding. Accordingly, vacuum molding is an advantageous feature of the invention.

The moisture uptake observed was also substantially increased.

EXAMPLE 5

A mat such as was described in Example 2 was prepared. Treatment was by chemical means comprising spraying a dielectric solvent (SRB1 ®, supplied by Technoutil-Chimie) onto the mat.

78 g polyester resin was added to 25 g of the mat thus treated. The remainder of the procedure was similar to that of the preceding examples. The fiber content of the resulting composite was 40 wt. %, and the composite was homogeneous.

The following characteristics were determined:

Specific gravity: 1.14.
Failure under flexure (MPa): 64.
Specific failure (MPa): 56.
Modulus for flexure (GPa): 2.
Specific modulus (GPa): 1.8.
Moisture uptake (wt. %): 11.4.

EXAMPLE 6

A compound comprised of loose fibers was prepared as in Example 1. It was treated chemically as follows. A bath containing 1 liter ethanol, 5 ml of 1 N sodium hydroxide, and 5 liter water was prepared. The fibers were prepared by mechanical means from a compacted mass, such that the fibers after preparation were well separated. 45 g fibers was steeped in the said bath 4 hr, followed by filtration, drying, and reseparation of the fibers.

16 g of the material thus pretreated was combined with 64 g polyester resin. The remainder of the procedure was similar to that of Example 1. The composite obtained weighed 60 g, of which 26% represented fibers.

The following characteristics were determined:

Specific gravity: 1.14.
Failure under flexure (MPa): 24.
Specific failure (MPa): 21.
Modulus for flexure (GPa): 1.7.
Specific modulus (GPa): 1.5.
Moisture uptake (wt. %): 8.5.

EXAMPLE 7

A composite material was prepared comprising a mat of cellulosic fibers sandwiched between two sheets of kraft paper. The mat employed was of the type described in Example 3. The kraft paper comprised sheets of weight 150 g/sq m, specific gravity 0.7, and thickness 0.22 mm.

The sandwich was thermally treated in an oven at 80° C., for 1 hr, followed by 1 hr at 70° C. The remainder of the procedure was similar to that of Example 1.

The following characteristics were determined:

Specific gravity: 1.08.
Failure under flexure (MPa): 108.
Specific failure (MPa): 100.
Modulus for flexure (GPa): 6.03.
Specific modulus (GPa): 5.6.
Moisture uptake (wt. %): 20.

As seen, the properties obtained were particularly desirable.

EXAMPLE 8

A chemico-thermo-mechanical pulp was employed to prepare a mat 3 mm thick. The pulp employed is characterized by numerous long fibers which are well separated and relatively flexible, and by a lignin content >25%. It arises from essence of eucalyptus.

The mat was treated with a lubricating composition based on Rhodoviol 30-5 ® polyvinyl alcohol (supplied by Rhone-Poulenc), in the amount of 2–6 g per sq m of fiber material.

The treated material was then inserted in mold with polyester resin. Pressure of 6 kg/sq cm was applied for 3 hr, cold.

The product was a homogeneous material with fiber content c. 30 wt. % (of the total weight of the composite).

EXAMPLE 9

A composite material was prepared comprising a rippled mat of cellulosic fibers sandwiched between two sheets of kraft paper. The mat comprised an assemblage of cellulosic fibers which had been rippled in advance. The kraft paper employed sheets of weight 150 g/sq m and thickness 0.22 mm. The corrugated insert comprised a paper of weight 120 g/sq m, with a corrugation amplitude of 1.5–6 mm. The sandwich was thermally treated in a 100° C. oven for 2 hr.

The procedure thereafter was generally as in Example 1, except that it was unnecessary to place the material in a mold because it was already rigidified by its corrugated structure.

The following characteristics were determined:
Specific gravity: 0.3
Failure under flexure (MPa): 1500.
Specific failure (MPa): 5000.
Modulus for flexure (GPa): 20.
Specific modulus (GPa): 6.6
Moisture uptake (wt. %): 10.

EXAMPLE 10

The procedure was generally as in Example 9, except that the polyester resin for the composite was replaced by an epoxy resin, e.g. Araldite ® (supplied by Ciba Geigy) or Epikote ® (supplied by the firm Shell).

A homogeneous material was obtained, with characteristics similar to those of the composite of Example 9.

What is claimed as new and desired to be secured by Letters Patent of the United States is:

1. A method of manufacturing a composite material comprising treating a reinforcement material comprised of discontinuous cellulosic fibers to lower the water content thereof to about 0%, placing said treated reinforcement material in a mold with a thermoplastic resin system, and exposing said mold to conditions of temperature and pressure such that said resin is cured.

2. The method according to claim 1, wherein said resin system comprises a crosslinking accelerator.

3. A method according to claim 1, wherein the treatment comprises a thermal treatment which consists of heating the reinforcing material.

4. A method according to claim 3, wherein the treatment is carried out in an oven at 100° C. for 1 hr.

5. A method according to claim 1, wherein the treatment is a chemical treatment.

6. A method according to claim 5, wherein the treatment is carried out using as a treating agent a lubricating composition which consists essentially of an alcohol.

7. A method according to claim 6, wherein the alcohol employed is ethanol.

8. A method according to claim 6, wherein the alcohol employed is polyvinyl alcohol.

9. A method according to claim 5, wherein the treatment is carried out using a composition comprising a dielectric solvent based on fluoridated derivatives.

10. A method according to claim 1, wherein the treatment is a chemical treatment which is combined with a thermal treatment.

11. A method according to claim 1, wherein the thermoplastic resin is an unsaturated polyester resin.

12. A method according to claim 1, wherein the thermoplastic resin is an epoxy resin.

13. A method according to claim 1, wherein the reinforcing component employed comprises a cellulosic fiber material produced from a chemical pulp, a thermo-mechanical pulp, a chemico-thermo-mechanical pulp, or a mixture of these.

14. A method according to claim 3, wherein in preparing the reinforcing component, a mat comprised of cellulosic fibers is prepared.

15. A method according to claim 5, wherein in preparing the reinforcing component, a material in the form of loose fibers is prepared.

16. A method according to claim 3, wherein in preparing the reinforcing component, a material in the form of two sheets of paper enclosing a planar or corrugated mat comprised of cellulosic fibers is prepared.

17. Composite materials obtained by employing the method according to claim 1.

18. Composite material comprised of a cured thermoplastic resin matrix in which is embedded a reinforcement component comprising discontinuous cellulosic fibers which have been treated prior to exposure to said resin to reduce the fiber's water content to about 0%.

* * * * *